April 7, 1970   F. R. EULIE   3,505,147
PROCESS OF COATING A PREHEATED METAL WEB WITH A GRAFT
COPOLYMER OF POLYETHYLENE AND A MONOMER HAVING
A REACTIVE CARBOXYL GROUP
Filed June 3, 1966
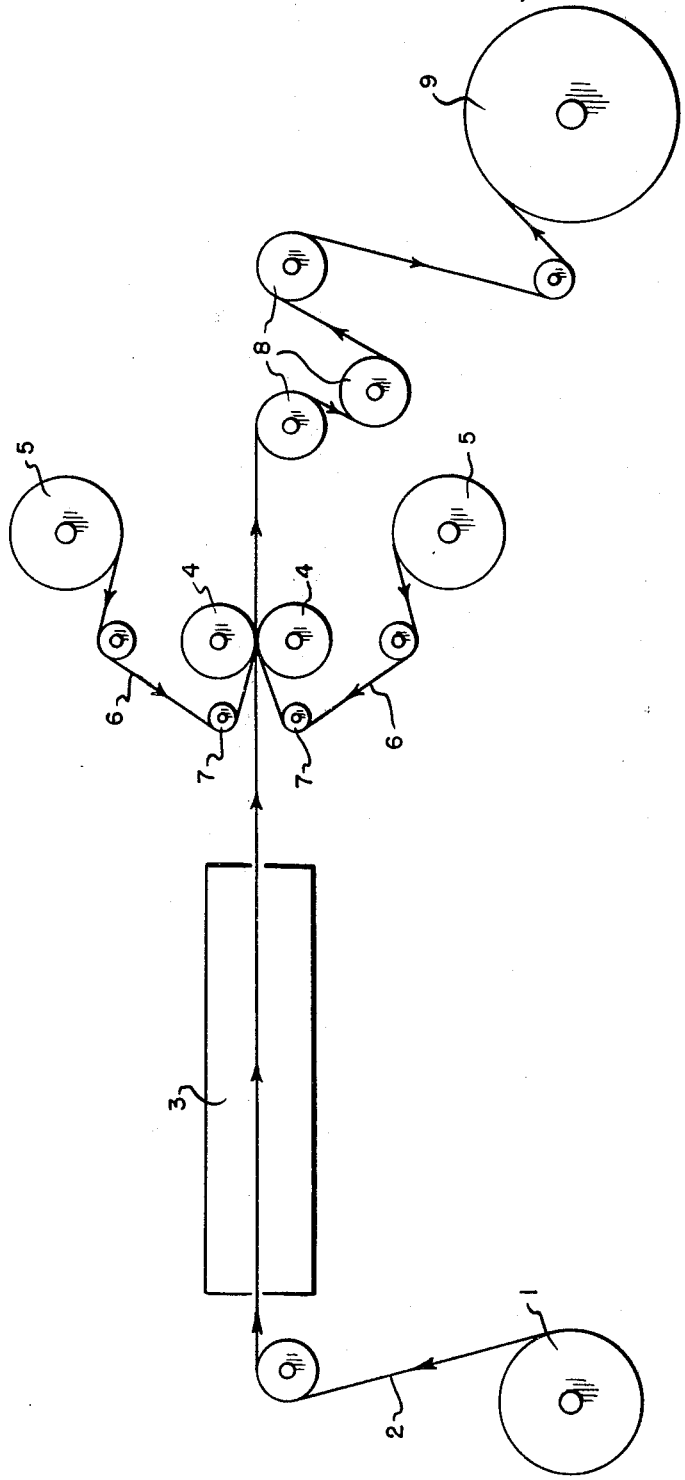
INVENTOR
Frank R. Eulie
BY
ATTORNEYS 3,505,147
PROCESS OF COATING A PREHEATED METAL WEB WITH A GRAFT COPOLYMER OF POLYETHYLENE AND A MONOMER HAVING A REACTIVE CARBOXYL GROUP
Frank R. Eulie, South Farmingdale, N.Y., assignor to Revere Copper and Brass Incorporated, New York, N.Y., a corporation of Maryland
Filed June 3, 1966, Ser. No. 555,075
Int. Cl. C09j 5/02; B32b 31/20
U.S. Cl. 156—321                                    1 Claim

ABSTRACT OF THE DISCLOSURE

A film of a graft copolymer of polyethylene and a monomer having a reactive carboxyl group is roll-bonded to the surface of a metal web by preheating the metal web, applying the film under sufficient tension to control its stretching so that, after the film has been bonded to the metal web by controlled compression at the preheat temperature, the film and the web will contract equally upon cooling.

---

This invention relates to coating metal webs and, more particularly, to a method of roll-bonding a non-metallic protective film to the surface of a metal web.

Metal webs, such as foils, covered on one or both surfaces with a protective non-metallic film have many uses. Some of these applications, particularly where the covered foil is used as a corrosion-proof shielding tape for electric cables, require assurance that the bond between the metal and the protective film is uniformly complete and that the bond will not fail in service. The difficulty in handling thin films of the protective material when applying them together with adhesive to the metal web without forming wrinkles and adhesive-free areas between the film and the metal has led to the use of extrusion technique to extrude a film of adhesion polymer material directly onto the metal web surface.

I have now devised a method of applying a thin film of protective material to one or both surfaces of a metal web without the complexity of extrusion yet capable of producing a wrinkle-free uniformly bonded layer of the protective material on the metal web surface. The method of the present invention utilizes roll-bonding of a thin film of a graft copolymer of polyethylene and a monomer having a reactive carboxyl group to the surface of the metal web under conditions which insure the desired defect-free bonding therebetween. This method comprises preheating the metal web to a temperature of about 250°–325° F., passing the preheated web to the nip of a pair of rolls surface-coated with a non-stick material and simultaneously passing the copolymer film over a crowned roll and thence directly under tension to the nip of the pair of rolls between one of the rolls and an adjacent surface of the metal web. The coated rolls are heated to a temperature maintained within the range of about 250°–325° F. while exerting a compressive force on the resulting film-web assembly therebetween sufficient to cause plastic deformation of the film against the surface of the metal web, and the thus-treated assembly is then cooled to a temperature below that at which adjacent layers of the assembly when wound in a roll tend to adhere to one another.

These and other features of the method of the invention will be more readily understood from the following description and the accompanying drawing in which the single figure is a schematic diagram of the steps of the method.

As shown in the drawing, a roll 1 of the metal web is unwound to supply a single sheet of the web 2 to a tunnel-type oven 3 or the like in which the web is heated to a temperature within the range of about 250°–325° F., and preferably about 300° F. Such an oven about 8 feet long and maintained at about 400° F. will heat 8 mil aluminum foil moving therethrough at 150 to 200 feet per minute to a temperature of about 300° F. The heated metal web 2 is then passed to the nip of a pair of rolls 4 coated with a non-stick material such as polytetrafluoroethylene resin.

Simultaneously, a roll 5 of a thin film of a graft copolymer of polyethylene and a monomer having a reactive carboxyl group, such as that described in U.S. Patents Nos. 2,987,501 and 3,027,346, is unwound to supply a copolymer film 6. The copolymer film is passed under tension over a crowned roll 7 of the type referred to variously as a "center-stretching" or "banana" roll. The combination of the tension on the film and its mild distortion by passing over the crowned roll 7 smooth out any looseness which would tend to cause wrinkles in the film as it is applied to the metal web surface and also slightly stretches the film temporarily. It presently appears that this controlled stretching of the film, transversely by the crowned roll 7 and longitudinally by the tension on the film, conditions the film so that after it is bonded to the preheated metal web surface the contraction of the metal during subsequent cooling to ambient temperature will be substantially matched by that of the film returning to its original dimensions. As a result, there is virtually no inherent tendency in the finished product for the film to wrinkle or to break away from the metal surface.

The copolymer film leaving the crowned roll 7 enters the nip of the non-stick coated rolls 4 between the surface of one roll and the proximate surface of the metal web. The tension of the copolymer film substantially eliminates flutter of the film which could, if it prevailed, cause wrinkles to form in the film. Moreover, I have found that when the angle between the copolymer film and the metal web entering the rolls 4 is at least about 15°, the resulting support of the copolymer film on the surface of the roll that it contacts prior to making contact with the surface of the metal web contributes to the laying of the film on the web without any wrinkles or other distortion at the instant of bonding.

Bonding of the copolymer film to the metal web surface is promoted by heat and pressure. To this end, the rolls are heated, by conventional means such for example as circulating hot oil, to a temperature of about 250°–325° F., and preferably to about 300° F. Within the aforementioned temperature range the film is softened so that compression by the rolls cause the film to flow plastically onto the metal web surface. The nature of the copolymer is that it has a strong bonding affinity for metal and will permanently adhere to the metal web surface.

The thus-bonded film-web assembly is then cooled, advantageously artificially, to a temperature at which it can be wound on a rewind roll without sticking of adjacent layers of the assembly to one another. Thus, it is presently preferred to pass the film-web assembly over one or more conventional cooling rolls 8 which are artificially cooled by water or recirculating brine, or the like. The film-web assembly is advantageously cooled to at least 90° F. before it reaches a rewind roll 9. The final roll of thus-coated metal web can then be cut or slit to any desired width without danger of the film parting from the web along the cut line.

The method of the invention is aplicable to the coating of a wide variety of metals among which aluminum, copper, lead and bronze are currently of particular interest for electric cable protective sheathing. Although the method has been described hereinbefore in connection with bonding one copolymer film to one surface of the metal web, both surfaces of the web can be simultaneously coated by supplying two sources of the copolymer film and applying them simultaneously to opposite surfaces of the metal web under the foregoing conditions as shown in the drawing. The method is applicable to the coating of metal webs ranging from about ½ mil to 10 mils or more, and in general the copolymer film thickness will range between about ½ mil to about 5 mils, that is, any film thickness generally considered to be effective for imparting the desired protection for the metal web surface. The thickness of the copolymer film determines in general the amount of tension which can be applied to the film between the crowned roll and the nip rolls. The amount of tension is sufficient to prevent significant flutter of the film entering the nip rolls, and in general it has been found that a tension of about 20% to 30% of the ultimate tensile strength of the film is satisfactory.

In addition to the effective and flawless bonding of the protective film to the metal web, the method of the invention has a further advantage in the ease with which bare splicing ends can be formed on the coated metal strip. That is, at any intervals throughout the length of the assembly and especially near the end of each roll of metal web as it approaches the nip rolls 4, an operator can insert a bond-preventing material, such as a sheet of kraft paper, between the surface of the metal web and either or both of the copolymer films immediately in front of the nip rolls so that there will be no bonding between the film and the metal at that area. The resulting unbonded film can readily be cut off without the necessity, common heretofore, of scraping, cutting or dissolving off the layer of protective film to provide a bare metal surface.

I claim:

1. The method of roll-bonding to the surface of a metal web a film of a graft copolymer of polyethylene and a monomer having a reactive carboxyl group which comprises preheating the metal web to a temperature of about 250°–325° F., passing the preheated web to the nip of a pair of rolls surface-coated with a non-stick material, simultaneously passing the copolymer film over a crowned roll and thence directly under tension to the nip of the pair of rolls between one of the rolls and an adjacent surface of the metal web, the tension being sufficient to cause stretching of the film substantially equal to the expansion of the preheated metal web so that both the film and the web contract equally as the coated web cools, the angle formed by the metal web and the copolymer film as they enter the bonding rolls being at least 15 degrees, heating the coated rolls to a temperature maintained within the range of about 250°–325° F., while exerting compressive force on the resulting film-web assembly therebetween sufficient to cause plastic deformation of the film against the surface of the metal web, and cooling the thus-treated assembly to a temperature below that at which adjacent layers of the assembly when wound in a roll tend to adhere to one another.

References Cited

UNITED STATES PATENTS

| | | | |
|---|---|---|---|
| 2,434,795 | 1/1948 | Glasing et al. | 156—549 XR |
| 2,690,206 | 9/1954 | Mueller | 156—244 XR |
| 2,728,703 | 12/1955 | Kiernan et al. | 156—320 |
| 2,740,741 | 4/1956 | Vaughan et al. | 156—164 |
| 2,987,501 | 6/1961 | Rieke et al. | 260—877 |
| 3,027,346 | 3/1962 | Rugg et al. | 260—878 |
| 3,047,934 | 8/1962 | Magner | 29—149.5 |
| 3,081,212 | 3/1963 | Taylor et al. | 156—164 |
| 3,262,192 | 7/1966 | Vukovcan et al. | 156—164 XR |
| 3,318,749 | 5/1967 | Califano et al. | 156—549 XR |

HAROLD ANSHER, Primary Examiner

M. E. McCAMISH, Assistant Examiner

U.S. Cl. X.R.

156—325, 322